Aug. 6, 1935.　　　　T. J. WOODS　　　　2,010,470
INDICATOR
Filed April 5, 1934　　　2 Sheets-Sheet 2

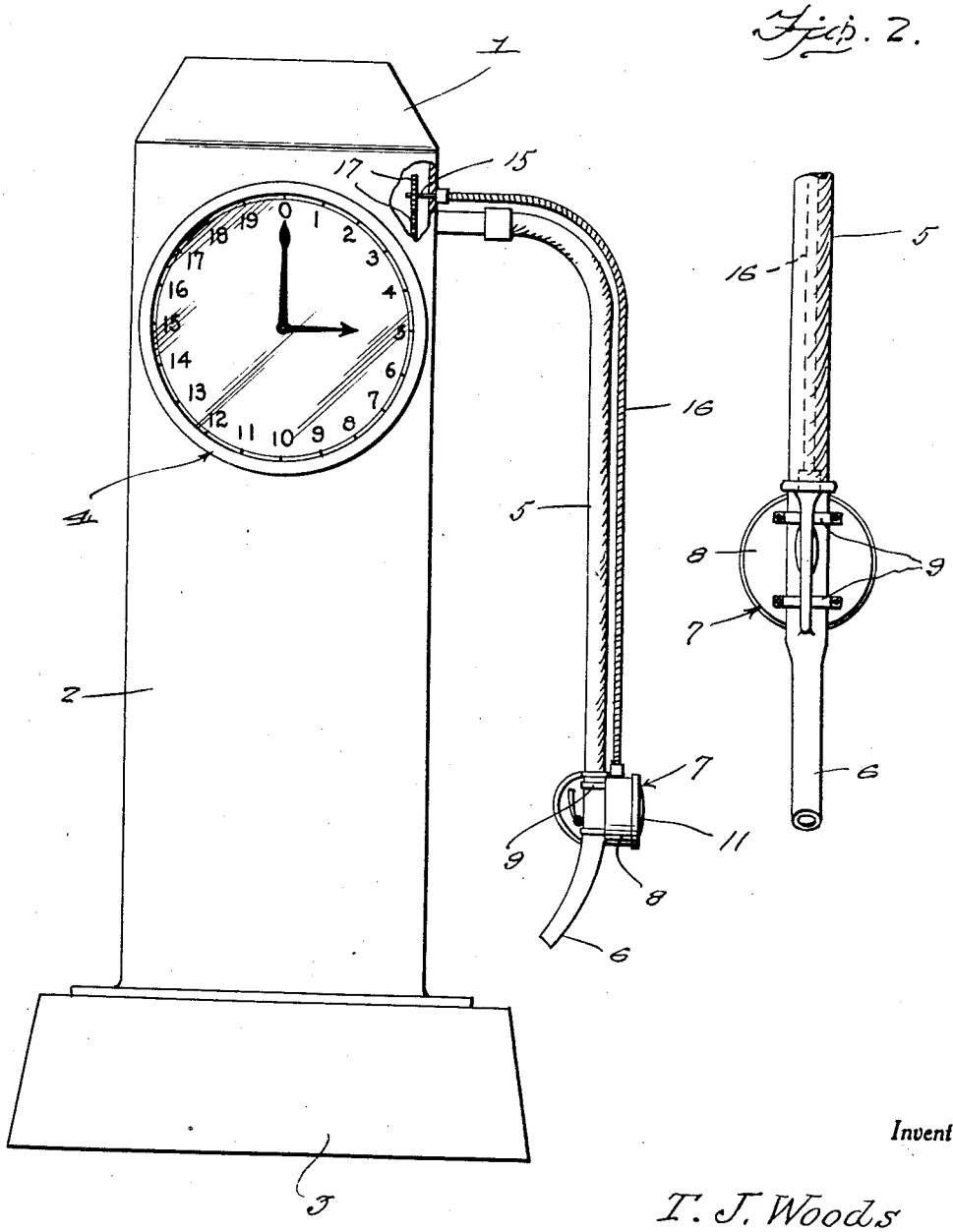

Inventor
T. J. Woods
By Clarence A. O'Brien
Attorney

Patented Aug. 6, 1935

2,010,470

UNITED STATES PATENT OFFICE 2,010,470

INDICATOR

Theodore J. Woods, Neosho, Mo.

Application April 5, 1934, Serial No. 719,227

2 Claims. (Cl. 116—114)

The present invention relates to new and useful improvements in indicators for gasolene dispensing pumps of the type including an electrically driven motor, a flexible conduit terminating in a discharge nozzle at its free end, together with an indicator on the pump casing.

In the use of pumps of the aforementioned character it is frequently necessary for the attendant to take his eyes from the automobile fuel tank which is being filled to observe the indicator on the pump, which frequently results in filling the tank to overflowing.

The primary object of the present invention is to provide an indicator mounted on the nozzle of the filling hose where it may be observed by the attendant while watching the filling of the tank, said indicator being operatively connected with the mechanism of the conventional indicator on the pump for operation in unison therewith.

Other objects of the invention are to provide an indicator of the aforementioned character which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view principally in front elevation of a conventional gasolene dispensing pump, showing an indicator in accordance with the present invention installed thereon.

Figure 2 is a bottom plan view of the indicator, showing the same mounted on the discharge nozzle of the filling hose.

Figure 3:
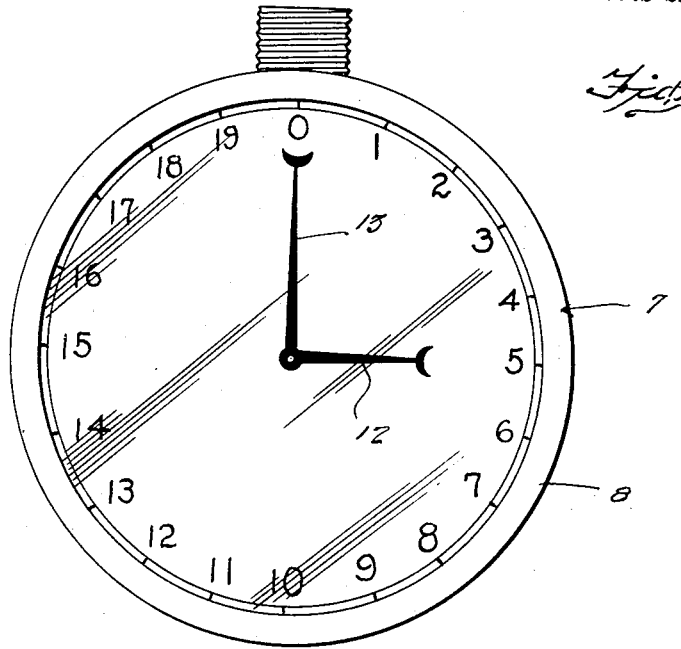
Figure 3 is a top plan view of the indicator.
Figure 4:
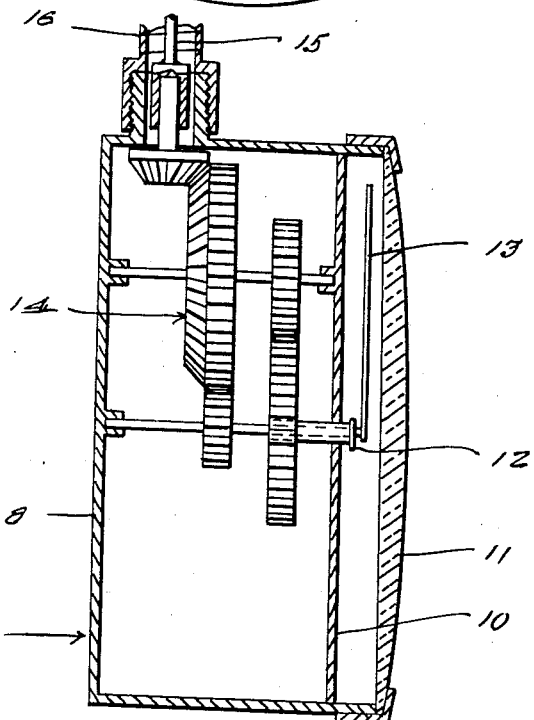
Figure 4 is a view in vertical section through the indicator.

Referring now to the drawings in detail, it will be seen that the reference numeral 1 designates generally a conventional gasolene dispensing pump of the motor driven type, said pump including a casing 2 rising from a base 3 and provided with an indicator which is designated generally by the reference numeral 4. The pump 1 further includes the usual delivery hose 5 provided on its free end with a discharge nozzle 6 for insertion in the gasolene tank of an automobile.

The embodiment of the present invention which has been illustrated comprises an indicator which is designated generally by the reference numeral 7, said indicator 7 including a housing 8 which is secured on top of the nozzle 6 adjacent the hose 5 by suitable means such as clamps or straps 9. The indicator 7 further includes a dial 10 behind a crystal 11 and between which gallon and fraction indicating hands 12 and 13, respectively, are operable.

Gears 14, mounted in the housing 7, operatively connect the hands 12 and 13 to a flexible drive shaft 15 which is enclosed in a flexible housing 16 having one end connected to the housing 8 of the indicator 7 and its other end connected to the pump casing 2 adjacent the point where the delivery hose 5 is connected to said pump casing, as best seen in Figure 1 of the drawings. If desired, the flexible housing 16 may be connected at spaced points to the delivery hose 5. Gears 17 (see Figure 1) connect the flexible drive shaft 15 to the mechanism which actuates the indicator 4 in the pump 1.

It will thus be seen that an indicator has been provided which may be conveniently observed by the attendant without the necessity for him removing his eyes from the tank being filled, thus preventing over-filling of said tank. Further, the indicator constituting the present invention will operate in unison with the usual indicator on the pump, which is usually observed by the customer from within the automobile, and will, therefore, have the same accuracy. If desired, the flexible drive shaft 15 may be built into the delivery hose 5 of the pump.

It is believed that the many advantages of an indicator constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. In combination with a dispensing pump including a casing, an indicator mounted on the casing, a flexible delivery hose and a discharge nozzle mounted on said hose, an indicator mounted on the nozzle, and means operatively connecting the second-named indicator with the first-named indicator for operation in unison therewith.

2. The combination with a dispensing pump comprising a casing, an indicator mounted on the casing, a delivery hose connected with said casing and a discharge nozzle connected to the delivery hose, of an indicator mounted on the nozzle, a flexible housing extending between the second-named indicator and the pump casing, and a flexible drive shaft extending through the flexible housing for operatively connecting the second-named indicator to the first-named indicator for operation in unison therewith.

THEODORE J. WOODS.